United States Patent

Harmuth et al.

[11] Patent Number: 5,552,354
[45] Date of Patent: Sep. 3, 1996

[54] REFRACTORY BRICK

[75] Inventors: Harald Harmuth, Villach; Roland Heindl; Josef Deutsch, both of Leoben, all of Austria

[73] Assignee: Veitsch-Radex Aktiengesellschaft fur Feuerfeste Erzeugnisse, Vienna, Austria

[21] Appl. No.: 404,915

[22] Filed: Mar. 16, 1995

[30] Foreign Application Priority Data

Mar. 17, 1994 [DE] Germany .................. 44 09 078.1

[51] Int. Cl.⁶ .................................................. C04B 35/01
[52] U.S. Cl. .................. 501/94; 501/95; 501/108; 501/103; 501/120; 501/127
[58] Field of Search ................. 501/95, 108, 120, 501/103, 127, 94

[56] References Cited

U.S. PATENT DOCUMENTS 5,283,215  2/1994  Hosokawa et al. ............... 501/120
5,344,802  9/1994  Knauss ............................. 501/120

FOREIGN PATENT DOCUMENTS

A2531130  3/1993  European Pat. Off. .

Primary Examiner—Mark L. Bell
Assistant Examiner—Michael Marcheschi
Attorney, Agent, or Firm—John F. A. Earley; John F. A. Earley, III

[57] ABSTRACT

The present invention pertains to a refractory brick based on at least one refractory metal oxide in a particle fraction of <8 mm containing 4 to 30 wt. % of a very fine refractory fraction, prepared by firing below a temperature at which the particles of the very fine refractory fraction sinter by recrystallization with grain growth.

7 Claims, No Drawings

REFRACTORY BRICK

The present invention pertains to a refractory ceramic brick.

Such bricks usually consist of a refractory material, especially one based on suitable metal oxides, such as MgO, $ZrO_2$, $Al_2O_3$, in various particle fractions, usually <8 mm.

Kneschke and Krawulsky reported a relationship between the particle structure and the properties of basic refractory batch compositions at the 33rd International Colloquium on Refractory Materials Held in Aachen on Oct. 8–9, 1990.

They divide the (basic) refractory granules into three particle size fractions, namely, the coarse fraction (>1 mm), the medium fraction (<1 mm), and the fine fraction (<0.09 mm), and it is pointed out that the fine fraction represents the strength-forming principal component during sintering as a highly reactive component, while the mechanical and thermal properties are said to be controlled by the medium and coarse fractions.

However, the mechanical properties can be influenced to a small extent only by setting the particle size spectrum. In addition, the presence of foreign oxides, e.g., within a sintered MgO used, reduce the effectiveness of certain grain sizes, because they increase the degree of sintering.

It is proposed in DE 42 33 015 C1 that a ceramic refractory oxide in the finest particle size range should be selected with a particle structure that follows a very special particle size distribution curve and that this should be used as a binder for ceramic masses. After addition to a ceramic mass and, if desired, after the preparation of moldings, good green strength and hot strength of the products are guaranteed.

The basic task of the present invention is to provide a refractory brick that possesses, after firing, favorable mechanical properties and especially the toughest (most ductile) behavior possible, i.e., the least brittle behavior possible.

The ductility (with m as the unit of measurement) is designated by R'''' and it follows the following law:

$$R'''' = \frac{G_f}{\sigma_f^2} \cdot E \quad [m]$$

The following proportionality applies as well:

$$R'''' \sim \frac{G_f}{G_0},$$

in which $G_f$ is the energy of fracture ($J/m^2$), $G_0$ is the energy of fracture for crack initiation ($J/m^2$), $\sigma_f$ is the stress at break ($N/m^2$), and E is the modulus of elasticity ($N/m^2$).

The present invention is based on the consideration that an improvement in the mechanical properties can be achieved by influencing the sintering behavior and here especially the sintering of the particles in the finest particle size range (flour range). It is advantageous for the most ductile behavior possible of the fired product if a crack that has formed must cut through a larger number of fine binding bridges, rather than a relatively small number of highly sintered, coarse binding bridges. As a result, the energy of fracture for crack initiation decreases, regardless of $G_f$, and $G_f/G_0$ as well as R'''' increase.

In its most general embodiment, the present invention consequently proposes a refractory brick based on at least one refractory metal oxide in a particle fraction of <8 mm and a very fine refractory fraction of <0.01 mm in an amount between 4 and 30 wt. %, which was prepared by firing below a temperature at which the particles of the very fine refractory fraction are sintered with adjacent particles in a recrystallization with grain growth.

The "firing" may also be carried out during the use of the brick, especially because the green strength can already be increased to a sufficient value by the very fine fraction. It is decisive that the strength of the brick and the binding of the brick that is necessary for this are brought about only by the very fine fraction and its sintering, so that there would not be no sufficient strength without the use of the very fine fraction.

Thus, not only are a large number of smaller binding bridges formed over the very fine particle fraction, but recrystallization with grain growth during the sintering of the very fine particles is markedly reduced or prevented from occurring due to the limitation of the firing temperature.

In other words, the refractory brick according to the present invention is characterized by the fact that the size of the ultrafine particles remains essentially unchanged even after firing compared with the nonfired state.

The combination of a very fine refractory fraction with a lower firing temperature compared with the state of the art is decisive.

The very fine refractory fraction may be introduced as a dispersed suspension or as a powder dispersion, and it may consist of usual refractory metal oxides, such as MgO, $Al_2O_3$, or $ZrO_2$.

The product according to the present invention is necessary especially when high-iron sintered magnesia is used, because it has a high $CaO/SiO_2$ ratio (greater than 1.87) and normally shows a strong tendency to sinter and possesses unfavorable mechanical properties in the above-described sense as a result.

Due to the selection of a special very fine refractory fraction and to the firing of the molding at relatively low firing temperatures, sufficient strength is reached in these products as well, especially due to the very fine fraction.

A typical batch composition according to the present invention comprises, e.g., of

- 70 to 96 (85 to 95) wt. % of a usual refractory matrix material in a particle fraction of <8 mm,
- 4 to 30 (5 to 15) wt. % of one or more refractory materials in a very fine fraction of <0.01 mm, or less than 0.001 mm (1 mm)

wherein the range limits given in parentheses have proved to be sufficient for accomplishing the task according to the present invention if this mass is subsequently processed into moldings and is fired at temperatures at which the particles of the very fine refractory fraction do not yet sinter with adjacent particles in a recrystallization with grain growth.

Based on a batch composition (D) comprising:

- 92 wt. % of sintered magnesite of the 0.5 to 4-mm fraction and
- 8 wt. % of an ultrafine magnesia dispersion with a maximum particle size of 0.001 mm, a brick possessing the following physical parameters is obtained after the usual processing and press-shaping under a pressure of 150 $N/mm^2$ and at a firing temperature of 900° C.:

| | |
|---|---|
| specific gravity: | 3.10 $g/cm^3$ |
| apparent porosity: | 13.20 vol. % |
| cold compressive strength: | 65.0 $N/mm^2$. |

Furthermore, the present invention makes it possible to further optimize the mechanical properties of the brick by containing reinforcing fibers, such as steel fibers. Even though the addition of, e.g., steel fibers to refractory masses and moldings has been known, it cannot usually be applied to fired products, because the steel fibers do not withstand the firing temperatures necessary in the case of, e.g., basic products. However, the reduced firing temperature in the case of the product according to the present invention makes it possible to use such fibers. The toughness of the brick is additionally increased by the use of, e.g., high-alloy steel fibers. This occurs even when steel fibers are added in as small amounts as 1 to 2 wt. % relative to the total weight. Thus, the following physical parameters are reached in the fired brick upon addition of 2 wt. % of steel fibers to the above-mentioned batch composition (D) (sample E):

| | |
|---|---|
| specific gravity: | 3.12 g/m$^3$ |
| apparent porosity: | 13.15 vol. % |
| cold compressive strength: | 85.0 N/mm$^2$. |

Chromium-alloyed steel fibers with a length of 25 mm and a Cr content of approx. 25 wt. % were used.

Such products can be advantageously used in industrial furnaces, in which temperatures that are below the stability limit of the steel fibers occur in the stressed brick area because of the operating temperature and the lining technique (temperature gradient). Examples are furnaces in the cement industry, nonferrous metallurgical industry and firing equipment. This also applies analogously to the product D. The effectiveness is unlimitedly ensured if the advantage of low-temperature firing is not superimposed by high operating temperatures. A typical field of application of the bricks according to the present invention is given when a temperature of approx. 1,200° C. is not exceeded or is exceeded only briefly in the middle third of bricks of the wear lining (thermomechanical stresses frequently occur here).

Additional physical parameters of a brick according to the present invention are shown below compared with prior-art products (A through C) (all data are in wt. %):

| Composition | A | B | C |
|---|---|---|---|
| Sintered magnesia (0.5 to 4 mm) | 72 | 68 | 70 |
| Sintered spinel (0.5 to 1.5 mm) | | 12 | |
| Sintered alumina (0.5 to 1.5 mm) | 8 | | |
| Magnesia flour (<0.1 mm) | 20 | 20 | 30 |

These batch compositions (A through C) were made into bricks in the above-described manner and fired at approx. 1,550° C.

The same high-iron sintered magnesia was used in all products A through E.

The table below shows the improvements that can be achieved in the ductility of the fired products by the use of the refractory bricks according to the present invention, wherein the measured R"" values are related to the maximum R"" value of all five samples, and they were determined at room temperature. The table analogously shows the corresponding values of the energy of fracture $G_f$, again related to the maximum $G_{fmax}$ of all five samples:

| | A | B | C | D | E |
|---|---|---|---|---|---|
| $\dfrac{G_f}{G_{fmax}}$ | 53 | 55 | 48 | 50 | 100 |
| $\dfrac{R""}{R""max}$ | 71 | 78 | 28 | 52 | 100 |

As can be recognized from the values, product E has by far the highest energy of fracture $G_f$, while the $G_f$ values of the other products differ only slightly from each other. The R"" value is also highest for the brick E according to the present invention. Even though brick D has a lower R"" value than the products A and B, it has a markedly better value than product C, which is the only purely magnesitic standard product. It follows from this that marked mechanical improvements can be achieved compared with purely magnesitic products even without the addition of sintered alumina or spinels if the features according to the present invention are taken into account. This is an economic, but also a technical advantage compared with the products containing additives (A and B), because more favorable high-temperature properties can thus be obtained, especially also in contact with basic (CaO-rich) foreign substances from the furnace chamber.

Further features of the present invention appear from the features of the subclaims.

We claim:

1. Refractory brick having improved ductility and energy of fracture, said brick formed of a ceramic refractory matrix material which comprises one or more metal oxides in two particle fractions, namely 4–30 wt. % smaller than 0.01 mm (10 μm), and 70–96 wt. % larger than 0.01 mm, but smaller than 8.0 mm, the brick having been prepared from said matrix material after molding and firing at a temperature below the sintering temperature of the particles of said fraction smaller than 0.01 mm and without recrystallization of said particles.

2. Refractory brick in accordance with claim 1, in which 5 to 15 wt. % of said refractory matrix material particles are smaller than 0.01 mm.

3. Refractory brick in accordance with claim 1, in which 4–30 wt. % of said refractory matrix material particles are smaller than 0.001 mm (1 μm).

4. Refractory brick in accordance with claim 3, containing reinforcing fibers.

5. Refractory brick in accordance with claim 4, in which the content of reinforcing fibers is 1.0 to 2.0 wt. % relative to the total weight.

6. Refractory brick in accordance with claim 4, in which said reinforcing fibers are steel fibers.

7. Refractory brick having improved ductility and energy of fracture, said brick formed of a ceramic refractory matrix material which comprises one or more metal oxides in two particle fractions, namely 4–30 wt. % smaller than 0.001 mm (1 μm), and 70–96 wt. % larger than 0.01 mm, but smaller than 8.0 mm, the brick having been prepared from said matrix material after molding and firing at a temperature below the sintering temperature of the particles of said fraction smaller than 0.01 mm and without recrystallization of said particles, the brick containing reinforcing fibers, said reinforcing fibers being steel fibers, the reinforcing fibers being 1.0 to 2.0 wt % relative to the total weight of the refractory brick.

* * * * *